US006324331B1

(12) United States Patent
DeMeritt et al.

(10) Patent No.: US 6,324,331 B1
(45) Date of Patent: Nov. 27, 2001

(54) PASSIVE PLATFORM FOR HOLDING OPTICAL COMPONENTS

(75) Inventors: Jeffrey A. DeMeritt, Painted Post; Cynthia A. Kubissa, Elmira, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/432,472

(22) Filed: Nov. 1, 1999

Related U.S. Application Data

(60) Provisional application No. 60/116,182, filed on Apr. 14, 1999.

(51) Int. Cl.[7] .......... G02B 6/36
(52) U.S. Cl. .......... 385/134; 385/135
(58) Field of Search .......... 385/135, 134

(56) References Cited

U.S. PATENT DOCUMENTS 4,373,776 * 2/1983 Purdy .......... 385/135
5,572,617 11/1996 Bernhardt et al. .......... 385/135
5,796,908 8/1998 Vicory .......... 385/135
5,835,660 11/1998 Jung et al. .......... 385/137
5,911,027 6/1999 Macken et al. .......... 385/135

OTHER PUBLICATIONS

U.S. Application No. 09/552,427, filed Apr. 19, 2000, Treichler et al.

* cited by examiner

*Primary Examiner*—John D. Lee
*Assistant Examiner*—Ellen E. Kim
(74) *Attorney, Agent, or Firm*—Eric Smith

(57) ABSTRACT

A passive platform for holding optical components includes a raised loading area comprising a series of finger members disposed along the platform floor, the finger members abutting each other and defining between them tunnels for holding optical components in place. A coil guide member projects upward from the floor abutting the raised loading area, the outer perimeter of the coil guide and the raised loading area defining a racetrack region of the floor for winding optical fiber leads extending from optical components being held in the tunnels, the optical fiber passing between the finger members and around the racetrack.

15 Claims, 6 Drawing Sheets

PASSIVE PLATFORM FOR HOLDING OPTICAL COMPONENTS

This application claims the benefit of priority under 35 U.S.C. § 120 of Provisional U.S. patent application Ser. No. 60/116,182 filed on Jan. 14, 1999, the content of which is relied upon and incorporated herein by reference in its entirety.

FIELD OF THE INVENTION

The present invention relates generally to improvements to systems and methods for manufacturing devices containing optical components, and more particularly to a system and methods for holding optical components in position in a device and splicing their leads together.

BACKGROUND OF THE INVENTION

Devices and systems employing fiber optics typically include a number of optical components that must be interconnected to form an optical path for the transmission of data. In one approach, optical components are mounted onto a printed circuit motherboard, and their optical fiber leads are then spliced together. The splicing process, however, is complicated by the relative fragility of optical fiber, which can be damaged by bending, excessive tension, or other stresses. Excessive signal attenuation due to bending of the fiber is also an issue. Further, the splicing process may require more than one attempt, if it is determined that the splice was not successfully made. In such a case, the improper splice must be broken out, the leads trimmed back, and a new splice performed. Finally, the continuous loop of fiber that results from a splice must be properly stowed away to prevent damage to the fiber.

FIG. 1 is a perspective view of one approach for mounting an optical component 10 onto a motherboard. The optical component 10 includes optical fiber leads 12, extending from either end. A cable tie 14, or spring clip, is used to attach the optical component 10 to a holder 16, which is fabricated from a glass-filled polymer or other suitable material that has coefficient of thermal expansion is close to that of optical fiber, is moldable and machinable yet stiff, and has other useful properties. Finally, the holder 16 is affixed to a motherboard by means of a pair of plastic rivets 18. This process is performed for all of the optical components used in the device being manufactured. Once all of the optical components have been securely mounted to the motherboard, their fiber leads must then be spliced together to create an optical path for the transmission of data. However, the task of splicing optical fiber leads together is far more complex than the splicing of electrical component leads.

The splicing task is typically a precise one. If the cores of two spliced fiber leads are not properly aligned, the optical path may be interrupted. In that event, the improper splice must be broken out and another splice performed. Thus, optical fiber leads tend to be quite long compared to electrical component leads, in order to provide a worker with an adequate amount of fiber to make numerous attempts at a proper splice.

However, this in turn means that the splicing together of two optical component leads results in a continuous loop of fiber, the length of which depends upon the amount of fiber required to achieve a proper splice. Because optical fiber is easily damaged, it is generally undesirable to have long loops of fiber freely floating within an optical device. Rather, the loops of fiber resulting from splices must be stowed away in a manner that will not result in damage to the fiber arising from bending, tension, or other mechanical stresses.

FIG. 2 is a partial perspective view of a system for managing the continuous loops of optical fiber resulting from the splicing of optical leads. The system provides a matrix of curved guides 20, **22*a–d*, made from a glass filled polymer or another suitable material, that are mounted to a motherboard 24. As described below, loops of optical fiber resulting from splices are protected from damage by winding them around the curved guides in a predetermined pattern. The length of these loops is precisely measured using grids 28*a* and 28*b*** so that an optimal level of slack is maintained in the loops after they are wound over the curved guides, the tension in the loops being sufficient to hold them in place on the guides without causing damage to the fiber or degrading the optical characteristics of the fiber.

The matrix of curved guides includes a set of six central coil guides 20 that are arranged to form a central coil. These central coil guides 20 are shaped, and are positioned relative to each other, such that optical fiber can be wound around them without causing damage to the fiber. In addition, the matrix of curved guides includes pairs of auxiliary guides **22*a–b*, 22*c–d* that are mounted onto the motherboard 24 on either side of each optical component, 10*a*, 10*b*. Each of these pairs of auxiliary curved guides 22*a–b*, 22*c–d* is shaped, and positioned relative to the central coil and to the optical components, such that the auxiliary curved guides 22*a–b*, 22*c–d* provide safe winding paths for the optical fiber leads 12 from their respective optical components to 10*a*, 10*b*** the central coil.

The functions of the central coil guides 20 can better be understood with reference to a specific example. FIG. 2 shows first and second optical components **10*a*, 10*b*, which are mounted to the motherboard 24. (For clarity of illustration, only one holder 16*a* is shown, although in an actual device, each optical component is held by its own holder). Each of these two optical components 10*a*, 10*b* has a pair of optical fiber leads 12*a–b*, 12*c–d*, extending from either end. In this example, a first lead 12*a*, that extends from the left end of the first optical component 10*a*, is spliced to a second lead 12*d*, that extends from the right end of the second optical component 10*b***.

Prior to the actual splicing of the two leads together, each lead must first be precisely measured and then trimmed, so that the continuous loop of fiber resulting from the splice will be the correct length. Measuring grids **28*a*, 28*b* are provided on the motherboard 24 to allow the worker to precisely determine the point at which the two leads 12*a*, 12*d* are to be spliced. Of course, the point chosen for the splice 30 must provide clearance for a splicing sleeve 26 between the center coil guides 20. Once a splicing point has been determined, using a measuring grid, the first lead 12*a* and the second lead 12*d*** are marked for length along the measuring grid.

The leads **12*a*, 12*d* are then stripped, cleaned, and cleaved at the marked splicing point so that the leads will meet at the proper spot and the splicing sleeve 26 is on a straight run. If that operation is successfully accomplished, the splicing sleeve 26 is then acrylated in place over the splice 30, forming a long, continuous loop of fiber 32 extending from the left end of the first component 10*a* to the right end of the second component 10*b*. If the splice 30 has been properly measured and executed, the length of the continuous loop of 32 is such that it will just fit over the center coil guides 20, with the splicing sleeve 26** coming to rest in its predetermined position.

The motherboard includes rows of optical components 10, with leads 12 extending out of either end. Because the position of each optical component is fixed, and because the splicing point for each pair of leads must be carefully measured and executed within a narrow tolerance, this method of splicing optical fiber leads is called a "deterministic" fiber wrapping process. As the complexity and quantity of optical communication systems modules increases, a number of disadvantages of the deterministic process have become apparent.

First, the above-described method for wrapping fiber requires a high degree of skill on the part of the worker performing the splicing process. The process of splicing optical fiber is a difficult, painstaking task, which is complicated by trying to achieve sufficient slack in the fiber after it is wrapped back onto the center coil guides. If the fiber is too tight, light loss may occur, and the fiber may even snap. If the fiber is too loose, the fiber may slide up and off the guides and wander within the device, which can cause it to get pinched or otherwise damaged by other components.

Second, the above-described method requires the use of a stiff platform to manufacture an assembly having mostly optical components and relatively few electronic components. Passive platforms can be manufactured from less expensive materials, resulting in greater cost efficiency.

Third, the loading of a platform with rigid guides and holders is a lengthy, time consuming process.

Finally, it is inefficient to go through the arduous loading, splicing and wrapping procedure, only to learn at a final test that a component loaded at the very beginning is inoperable and must be replaced.

These and other issues are addressed by the invention described herein. Optical components are loaded into a specially designed passive platform module that is preferably constructed out of foam, elastomer, or other compliant material. In a first embodiment of the present invention, the platform is constructed from a fairly dense foam material, exemplary of which is a foam having a density of approximately four-pounds per cubic foot. Foam is a very inexpensive material. Even fabricated, its cost is far less than that of the use of rigid guides and holders on a printed circuit board, as described above. Foam will not harm optical fiber, even if the foam is rough in texture.

At present, in order to address these concerns, a so-called "deterministic" system can be used, in which the position of the optical component is fixed, e.g., by mounting it firmly in place on a motherboard, requiring the splice be made at a precise location at the ends of the mating fiber leads. As described below, this system has a number of disadvantages, both because of cost, and high degree of the skill required to execute the splice in the proper position. These and other disadvantages are addressed by the present invention.

SUMMARY OF THE INVENTION

A first embodiment of the invention provides a platform for holding optical components and their spliced leads. The platform includes a raised loading area comprising a series of finger members disposed along the floor of the platform for holding optical components in place. The platform further includes a coil guide member that projects upward from the floor, abutting the finger members, the outer perimeter of the coil guide and the finger members defining a racetrack region of the floor, within which the optical fiber leads are wound.

The platform module of the present invention results in a number of advantages over prior art optical device packaging. For example splices among the components loaded into the platform module are performed within the fiber friendly confines of the platform module. Once these splices have been successfully completed, the module is attached as a single unit onto a motherboard or, alternatively, into a unifying bus architecture. After the module has been attached to the motherboard, any additional splices between components within the platform and components mounted to the motherboard may be performed within the platform.

A further advantage of the present invention is the "free fiber routing" concept embodied in the method used for loading the components and splicing their leads together. The fiber leads are measured and marked before splicing, however, because the passive foam platform uses a "racetrack" to house the fibers rather than wrapping the fibers around rigid guides, it is no longer necessary to locate the splice at a precise, fixed point on the motherboard to achieve the desired result. Rather, the passive foam platform provides a relatively wide range of acceptable locations for the splicing point, as described in greater detail below.

Another advantage of an embodiment of the present invention is the ability to use a resilient material, exemplary of which is soft foam, to make the platform module from. The use of a soft foam material protects the fibers from the usual problems of sharp edges that can cut, bend or otherwise disrupt the functionality of the fibers. This material is easier to form and consequently offers greater cost-efficiencies than using either machined or molded glass filled polymers. Additionally splicing of optical fiber leads becomes easier, because the optical fiber leads do not require very precise lengths. Therefore, assembly time and associated production costs are lowered.

Another advantage of the present invention as embodied in a platform concept is that the tight wrapping of optical fibers around rigid guides is no longer required. This is because exterior walls retain fibers within the racetrack; thus, the losses associated with tight wrapping are eliminated.

A further advantage of the present invention as embodied in the modularization of optical circuit components allows testing of modules prior to final assembly. This testing of modules facilitates the location of problems or nonfunctional modules before assembling a complex optical device having large numbers of components.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention, and together with the description serve to explain the principles and operation of the invention.

DETAILED DESCRIPTION

The present invention now will be described more fully with reference to the accompanying drawings, in which currently preferred embodiments of the invention are shown. However, the described invention may be embodied in various forms and should not be construed as limited to the exemplary embodiments set forth herein. Rather, these representative embodiments are described in detail so that this disclosure will be thorough and complete, and will fully convey the structure, operation, functionality and potential scope of applicability of the invention to those skilled in the art.

Figure 1:
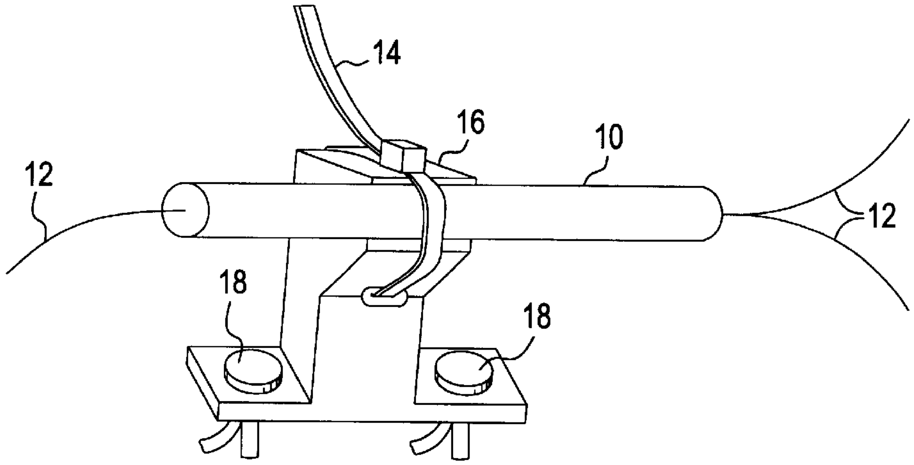
FIG. 1 is a perspective view of a system for mounting an optical component onto a motherboard.
Figure 2:
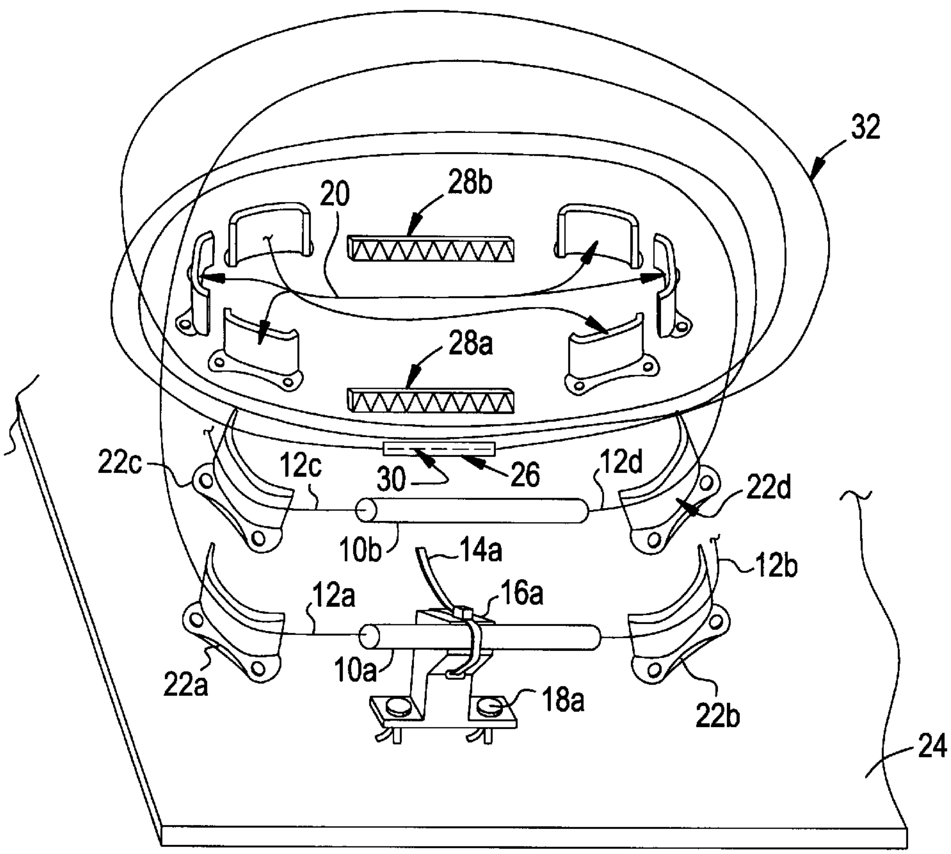
FIG. 2 is a partial perspective view of a motherboard embodying a system for splicing together optical fiber leads and stowing the resulting continuous loop of fiber.
Figure 3:
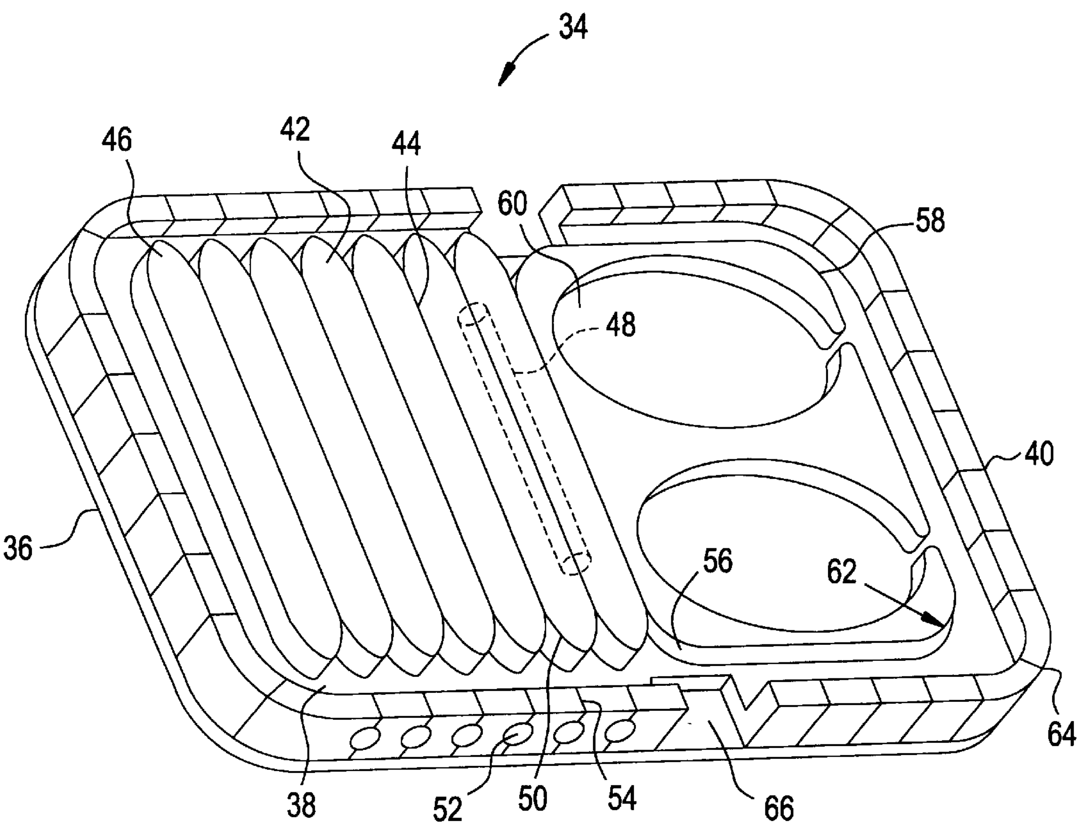
FIG. 3 is a perspective view of a passive platform in which to the present invention is embodied.

FIG. 3 is a perspective view of a first embodiment of a platform 34 according to the present invention. The platform 34 is glued to or molded on a firm base 36, or skeleton. Exemplary of the firm base is a rigid material having a thickness of about 0.3 inch. The firm base 36 gives the platform 34 some rigidity for attachment purposes. Aside from the base, all of the platform components are fabricated from foam or other suitable resilient materials.

The platform 34 includes an interior floor 38 at its bottom, and an wall 40 encircling its perimeter. The interior of the platform 34 includes two main sections. At the left side of the platform is a raised loading area 42. The raised loading area 42 is divided by a parallel series of slits 44, each extending from the top of the raised loading area 42 to the interior floor 38 of the platform 34, into a plurality of finger members 46 lying side by side. Each slit 44 leads to a component tunnel 48 that has been hollowed out between adjacent finger members 46*a* & 46*b* and that is shaped to receive an optical component. The shape of each component tunnel 48 may, if desired, be customized to have a particular optical component both in profile, e.g., square or round, and in length. Access to each component tunnel 48 is by spreading apart the two finger members 46*a* & 46*b* in which the component tunnel 48 has been formed. This causes the slit 44*a* between the two finger members 46*a* & 46*b* to open, thereby exposing the component tunnel 48. The ends 50 of the finger members are rounded, with radii selected to prevent any bending of optical fiber leads 12 wound around them.

In one of the present embodiments of the invention, it is contemplated that optical fiber leads may be wound in either direction in the racetrack 56, described below, after exiting from a component tunnel 48. The only exception is the optical fiber leads extending from an optical component that is held between the first and second finger members on the left side of the raised loading area. In order to prevent damage to the fiber leads, the upper lead can only be wound in a clockwise direction, and the lower lead can only be wound in a counterclockwise direction, viewed from above.

A series of holes 52 are provided in the platform's exterior wall 40. The holes 52 correspond to, and are in alignment with the component tunnels 48 between the finger members 46. There is a hole 52 at the end 50 of each finger member 46. Each of the holes 52 is intersected by an access slit 54 at its top, extending through the exterior wall 40. Once an optical component 10 is properly seated in a component tunnel 48, the optical fiber leads 12 extending from the optical component 10 are inserted into a corresponding hole 52 in the exterior wall 40 by spreading the access slit 54 corresponding to the hole 52, thereby exposing the hole 52 and allowing the optical fiber lead 12 to be placed therein. This is done to "dress" the optical fiber leads 12 out and away from the component 10. Additionally, the holes 52 may be used to restrain optical fibers for future splicing and prevent them from being pinched or stressed as the platform 34 is loaded.

In the embodiment of the present invention illustrated in FIG. 3, the right side of the platform 34 includes a generally rectangular coil guide 58, with a pair of circular interior sections 60. Each circular interior section 60 has an opening into the racetrack 56. Thus, the coil guide 58 is E-shaped. The "E" shape of the coil guide 58 minimizes the amount of material used, while maximizing strength and stability. The corners 62 of the coil guide 58 are rounded, with radii selected to prevent bending and to minimize the stress in the loop of fiber 32 wound around the coil guide 58. Also, as shown in FIG. 3, the coil guide 58 abuts one of the fingers 46, defining between them a slot through which optical fiber can pass. This slot provides a "turnaround" that may be used to change the direction of winding of optical fiber, i.e., from a clockwise to a counterclockwise direction, or vice versa.

The outer perimeters of the coil guide 58 and the raised loading area 42, the platform floor 38, and the inner perimeter of the exterior wall 40 define a "racetrack" 56. A racetrack is a closed-loop path around which excess fiber is wound Unlike an optical device manufactured using rigid glass filled polymer fiber guides to position a splice and wind excess fiber about, the precise tension of optical fiber wound around the racetrack 56 is not critical to proper manufacture.

There are a number of notches 64 in the exterior wall 40 surrounding the racetrack 56. These notches 64 serve, to provide access for fibers from outside the module and, as a measurement gauge for use in determining the point two optical fiber leads 12 are to be spliced together. As described below, however, this embodiment of the present invention tolerates a relatively wide range of locational deviation from the measured splicing point. In an exemplary splice the ends of the optical fiber leads 12 are spliced together and then protected by a splicing sleeve 26. An important constraint being that the splicing sleeve 26 lie in a straightaway section of the racetrack 56. Thus, a splice cannot be made at a corner of the racetrack 56.

The exterior wall 40 also may include cutout sections 66 to allow optical fibers to enter the platform 34 for splicing. These cutout sections 66 would be used, for example, to connect separate modules together. Although FIG. 3 shows cutout sections located between the finger members 46 and the coil guide 56, they may be located anywhere in the exterior wall 40.

Figure 4:
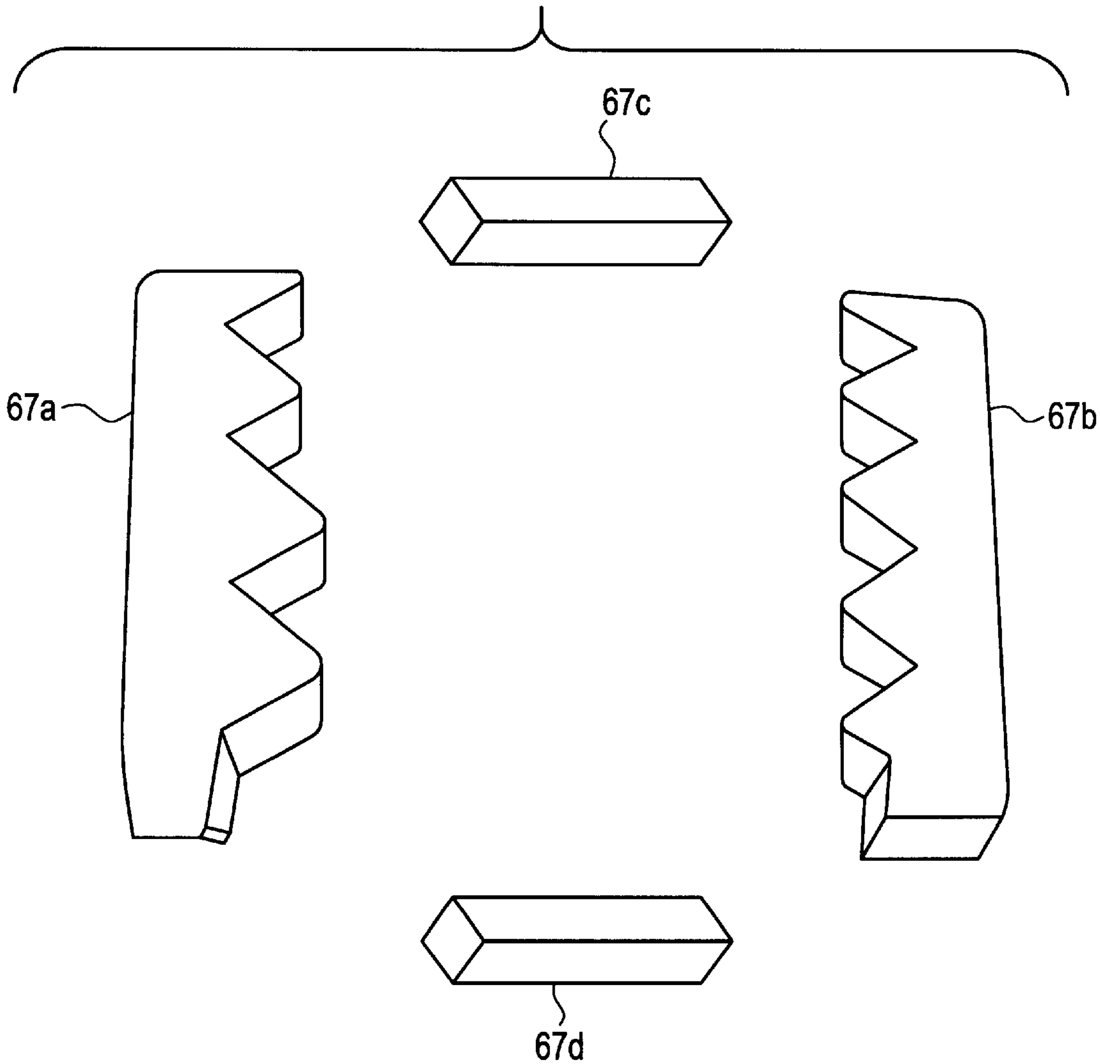
FIG. 4 is a perspective view of a first embodiment of retainer members to be used in conjunction with the passive platform shown in FIG. 3.

FIG. 4 shows a perspective view of four retainers 67*a–d*. These retainers 67*a–d* fit over the racetrack 56 and hold the optical fibers in place. In one embodiment, the retainer members 67*a–d* have a thickness of approximately ⅛ inch, and are made from foam or another resilient material. The retainers 67*a–d* are held in place over the racetrack 56 by friction. The thicknesses of the retainers 67*a–d* are determined by the amount of fiber in the track and the depth of the track.

Figure 5:
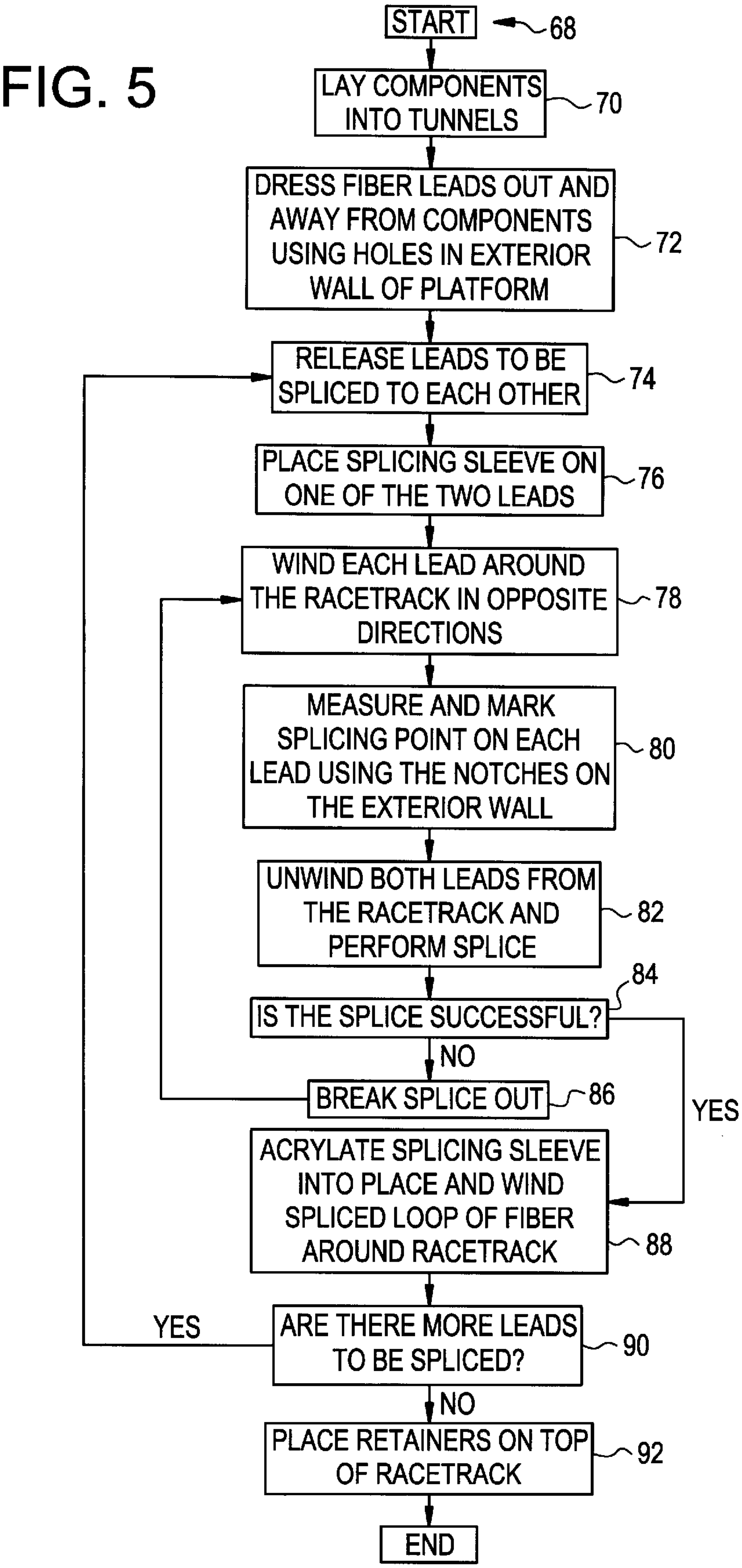
FIG. 5 is a flowchart of a splicing method for use with the passive platform shown in FIG. 3.

FIG. 5 shows a flowchart of a splicing method 68 embodiment of the present invention, using the platform 34 shown in FIG. 3. In step 70, each optical component is laid into a component tunnel 48 by spreading the corresponding slit 44 apart to expose the component tunnel 48 between the finger members 46. The foam is then repositioned around the component. In step 72, the access slits 54 leading to the holes 52 in the exterior wall 40 opposite the tunnels 48 are spread open so that the optical fiber leads can be threaded into the holes 52 to "dress" them out and away from the components. The holes 52 also serve to restrain the leads for future splicing and prevent them from being pinched or stressed as the platform is loaded.

Once all the optical components 10 are properly secured in their receiving component tunnels 48, and all of the optical fiber leads 12 are properly threaded through the corresponding holes 52 in the exterior wall 40, the optical fiber leads 12 are spliced together. In step 74, each of a pair of mating optical fiber leads 12 is released from its hole 52 in the exterior wall 40. In step 76, a splicing sleeve 26 is placed on one of the two optical fiber leads 12. In step 78 each optical fiber lead 12 is wound around the racetrack 56 in opposite directions. Before attempting a splice for the first time, the optical fiber leads 12 are wound around the racetrack 56 at least three times beyond the point in the racetrack at which they meet, in order to allow for repeated splicing attempts. In step 80, the notches 64 in the exterior wall 40 surrounding the racetrack 56 are used to measure the splice point to ensure that the it lies in a straightaway section of the racetrack 56 to accommodate the splicing sleeve 26.

In step 82, the optical fiber leads 12 once measured and marked, are unwound from the racetrack 56, and the splice is conventionally made. In step 84, the splice is tested to determine whether or not the splicing operation was successful. If the splice fails, then in step 86 the splice is broken out and steps 78–86 are repeated until a successful splice is made. Once an acceptable splice is obtained, the splicing sleeve 26 is sealed in place using an acrylate, and the resulting continuous loop of fiber 32 is wound around the racetrack 56, in step 88. Steps 72–88 are repeated until it is determined in step 90 that there are no additional leads to be spliced together. After the splicing operation is completed, then in step 92, retainers 67*a*-dare placed on top of the fiber leads, holding them in place by friction.

Using a platform 34 according to the present invention, it will be appreciated that, instead of having tight wraps of optical fibers and very specific locations for the splices, the optical fiber lies freely within a region of the platform. If the actual point at which the leads are spliced together does not exactly correspond to the measured splicing point, it is of little consequence, as the loop of fiber 32 compensate for this deviation in placement around the racetrack 56 by moving closer to or farther away from the walls, as needed. This allows less experienced assemblers to work with products with more complexity and higher volumes. This also eliminates the fiber tension problem inherent to deterministic fiber wrapping.

Splicing leads from items located outside of the platform 34, such as larger optical components, lasers, pigtail connector leads, or other optical devices is also done on the platform 34 racetrack 56. The outside leads enter the racetrack through one of the cutout sections 66, or another opening 64, in the exterior wall 40. After entering the platform 34, the outside leads are wound around the racetrack 56 and the splicing procedure, as described above, is followed. These items are spliced in after the platform module is mechanically attached to the main assembly, or motherboard 24.

Figure 6:
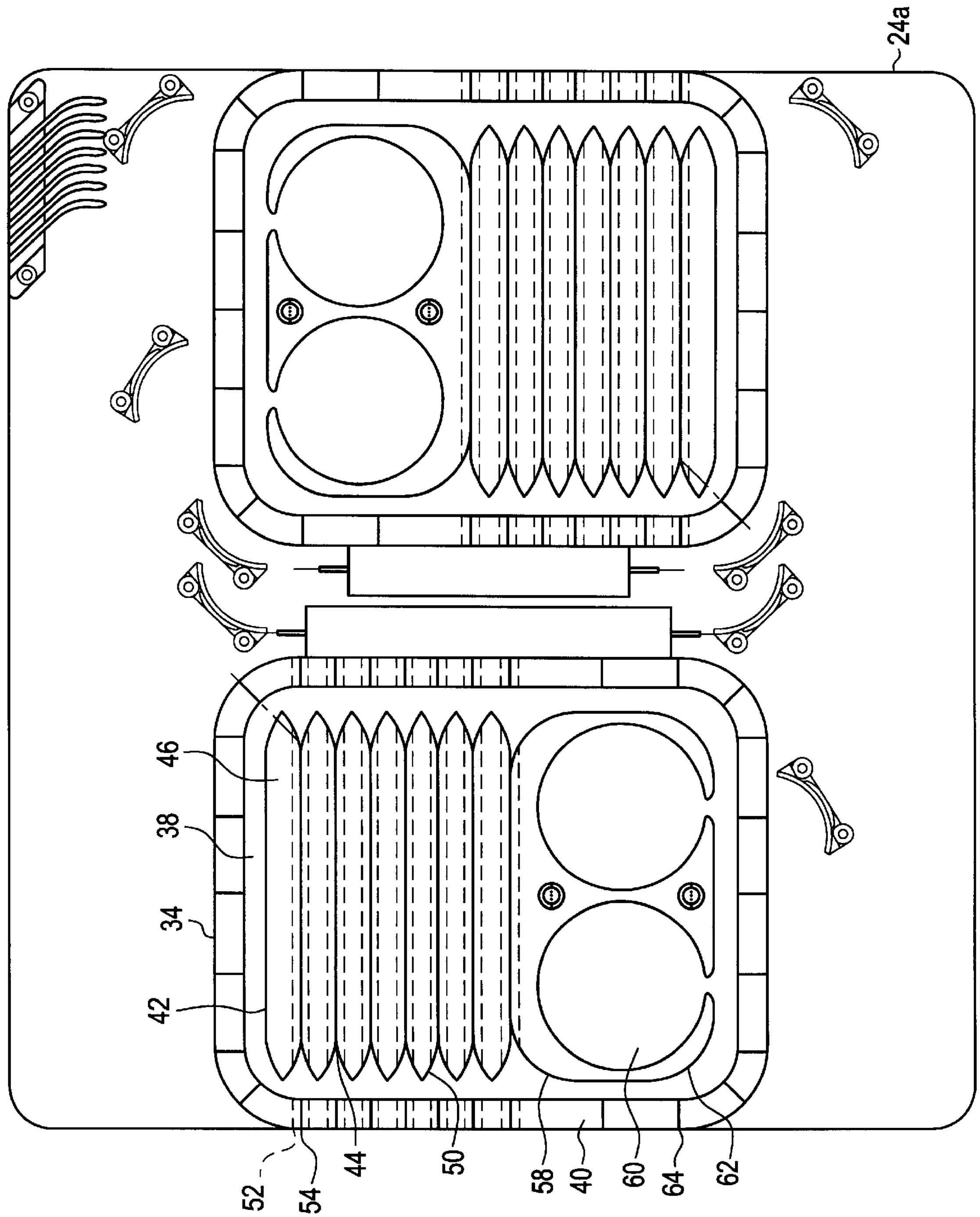
FIG. 6 is a top view of a motherboard incorporating the passive platform shown in FIG. 3.

FIG. 6 is a top view of a pair of passive platforms 34*a*, 34*b* according to an embodiment of the present invention that have been attached to a motherboard 24*a*. The motherboard 24*a* in FIG. 6 performs the same electronic and optical functions as the motherboard 24 in FIGS. 3A and 3B. It will be appreciated that this embodiment of the present invention drastically reduces the number of parts that must be attached to the motherboard 24*a*. First, there are no Ultem component holders and associated hardware. Second, although a few rigid auxiliary fiber guides 22 are still used for providing winding paths for optical fiber 104 from motherboard optical components 102 into the passive foam platforms, it will be apparent that the FIG. 6 motherboard 24*a* uses far fewer of these auxiliary guides 22 than does the motherboard 24 in FIGS. 3A and 3B.

Figure 7:
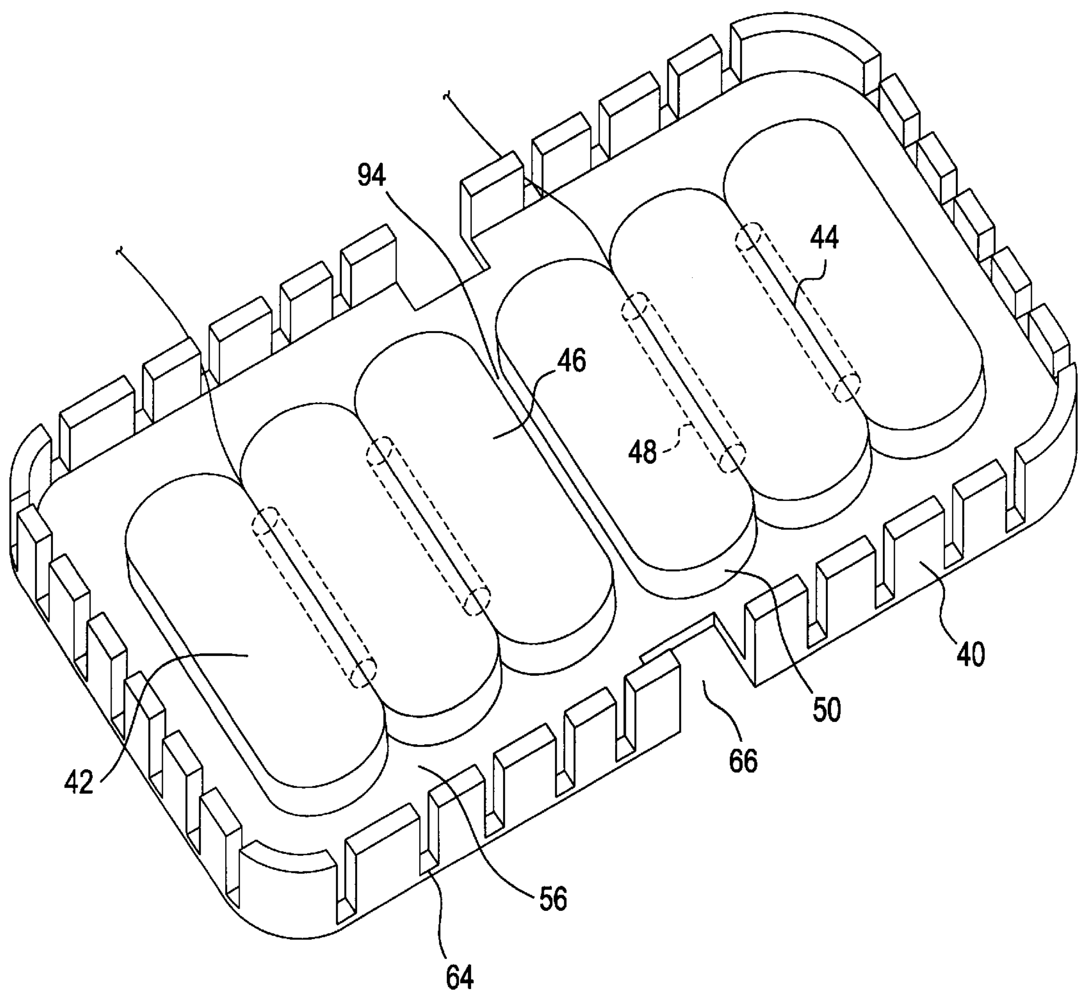
FIG. 7 is a perspective view of a second embodiment of a passive platform according to the present invention.

Finally, FIG. 7 shows an alternative embodiment of the present invention in which the racetrack 56 is defined by the outer perimeter of the raised loading area 42. Similar to the embodiment in FIG. 3 in the embodiment in FIG. 7, the raised loading area 42 includes a plurality of finger members 46, which are separated by access slits 44 leading to component tunnels 48. The slots 106 in the exterior wall 40 have been opened up somewhat, replacing the holes 52 with access slits 54 of the embodiment shown in the FIG. 3. Cutout sections 66 are provided for receiving external leads and for interconnecting separate modules. This smaller version of the invention may be used, for example, where there are relatively few optical components to be spliced together or where the space available for mounting and splicing optical components is limited. Further, the FIG. 7 embodiment includes a turnaround slot 94, which allows the direction in which an optical fiber lead 12 is wound around the racetrack 56 to change.

It will be apparent to those skilled in the art that various modifications and variations can be made in the present invention without departing from the spirit and scope of the present invention. Thus, it is intended that the present patent cover the modifications and variations of this invention, provided that they come within the scope of the appended claims and their equivalents.

What is claimed is:

1. A platform for receiving optical components, comprising:

a substrate having a surface;

a plurality of fingers disposed along said surface for holding said optical components in a plurality of predetermined positions; and a coil guide projecting upwards from said surface adjacent to at least one of said plurality of fingers, wherein said coil guide and said plurality of fingers define a path for the winding of optical fibers;

wherein each of said plurality of fingers is adjacent to at least one other of said plurality of fingers, said adjacent fingers defining between them a cavity for securing said optical components.

2. The platform of claim 1 wherein said adjacent fingers further define a passage for accessing said cavity.

3. The platform of claim 1 wherein said each of said plurality of fingers includes rounded ends.

4. The platform of claim 1, wherein said coil guide and at least one of said plurality of fingers define between them a slot for receiving optical fiber.

5. The platform of claim 1, wherein said coil guide is generally rectangular in shape.

6. The platform of claim 5, wherein said coil guide includes radiused corners.

7. The platform of claim 6, wherein said coil guide includes:

two interial depressions; and two passageways, each providing access to one of said two interial depressions.

8. The platform claim 1, further-comprising:

a wall extending upwards from said surface, said wall surrounding said plurality of fingers and said coil guide.

9. The platform of claim 8, wherein said wall defines a plurality of holes, each of said plurality of holes disposed to receive an optical fiber attached to one of said optical components.

10. The platform of claim 9 wherein said wall defines a plurality of openings.

11. The platform of claim 1 wherein said platform is made from foam.

12. The platform of claim 11 further comprising a rigid substrate attached to said platform.

13. A platform for receiving optical components, comprising:

a surface;

a plurality of fingers disposed along said surface for holding said optical components in a plurality of predetermined positions; and a coil guide projecting upwards from said surface adjacent to at least one of said plurality of fingers, wherein said coil guide and said plurality of fingers define a path for the winding of optical fibers;

wherein each of said plurality of fingers is adjacent to at least one other of said plurality of fingers, said adjacent fingers defining between them a cavity for securing said optical components.

14. A method for making an optical device comprising the steps of:

positioning a first optical component in a receiving platform, said first optical component having a plurality of optical waveguide fiber leads;

positioning a second optical component in said receiving platform, said second optical component having a plurality of optical waveguide fiber leads;

selecting one of said plurality of optical waveguide fiber leads of said first optical component;

selecting one of said plurality of optical waveguide fiber leads of said second optical component;

selecting a splice point on each on said selected leads;

splicing said selected leads to one another, said splicing occurring at said selected splice points; and storing said spliced leads on said receiving platform;

wherein said receiving platform comprises:

a surface;

a plurality of fingers disposed along said surface for holding said optical components in a plurality of predetermined positions; and a coil guide projecting upwards from said surface adjacent to at least one of said plurality of fingers, wherein said coil guide and said plurality of fingers define a path for the winding of optical fibers;

wherein each of said plurality of fingers is adjacent to at least one other of said plurality of fingers, said adjacent fingers defining between them a cavity for securing said optical components.

15. The method of claim 14 wherein said step of selecting a splice point on each on said selected leads further comprises the steps of:

winding said selected optical waveguide fiber lead of said first optical component in one direction along said path;

winding said selected optical waveguide fiber lead of said second optical component in the opposite direction along said path;

marking each of said selected optical waveguide fiber leads so that a splice made at said marks is at predetermined position on said racetrack.

* * * * *